United States Patent [19]

Ito

[11] 4,152,814
[45] May 8, 1979

[54] SWIVEL HOOK

[76] Inventor: Miyotsugu Ito, 172-2, Shimokosaka, Higashiosaka-shi, Osaka-fu, Japan

[21] Appl. No.: 882,892

[22] Filed: Mar. 1, 1978

[30] Foreign Application Priority Data

Aug. 11, 1977 [JP] Japan .......................... 52/108718[U]

[51] Int. Cl.² ............................................. A44B 13/00
[52] U.S. Cl. ............................ 24/241 PS; 24/241 SL
[58] Field of Search ........ 24/241 PS, 241 SL, 230 AL

[56] References Cited
U.S. PATENT DOCUMENTS

| 1,326,401 | 12/1919 | Herres | 24/241 SL |
| 2,276,628 | 3/1942 | Quilter | 24/241 PS |

FOREIGN PATENT DOCUMENTS

| 410843 | 5/1910 | France | 24/241 PS |
| 447051 | 12/1912 | France | 24/241 PS |
| 218295 | 12/1941 | Switzerland | 24/241 PS |
| 256058 | 7/1948 | Switzerland | 24/241 PS |
| 1058 of | 1855 | United Kingdom | 24/241 PS |
| 638498 | 6/1950 | United Kingdom | 24/241 SL |

*Primary Examiner*—Bernard A. Gelak
*Attorney, Agent, or Firm*—Wenderoth, Lind & Ponack

[57] ABSTRACT

An improved swivel hook is disclosed which has a tubular body, a swivel, a hook-like portion pivoted to one end of the body, and a locking pipe mounted on the body for limited axial movement. The swivel hook can be locked in the locking pipe simply by pushing it down and can be unlocked by pulling the locking pipe against a spring mounted in the body.

1 Claim, 2 Drawing Figures

SWIVEL HOOK

This invention relates to an improved swivel hook.

An object of this invention is to provide a swivel hook easy to lock and unlock.

Figure 1:
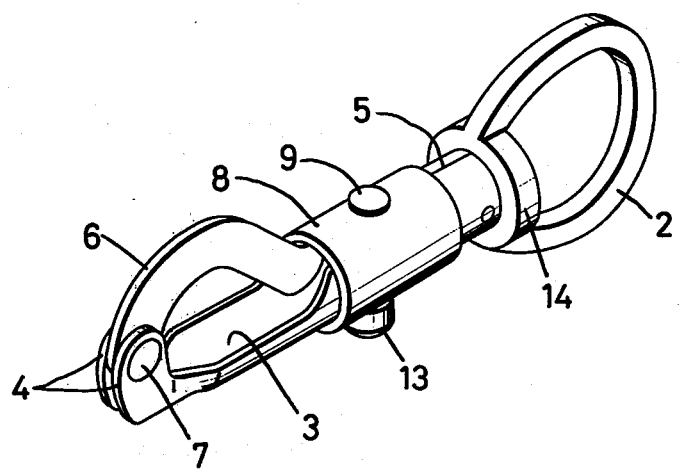
Figure 2:
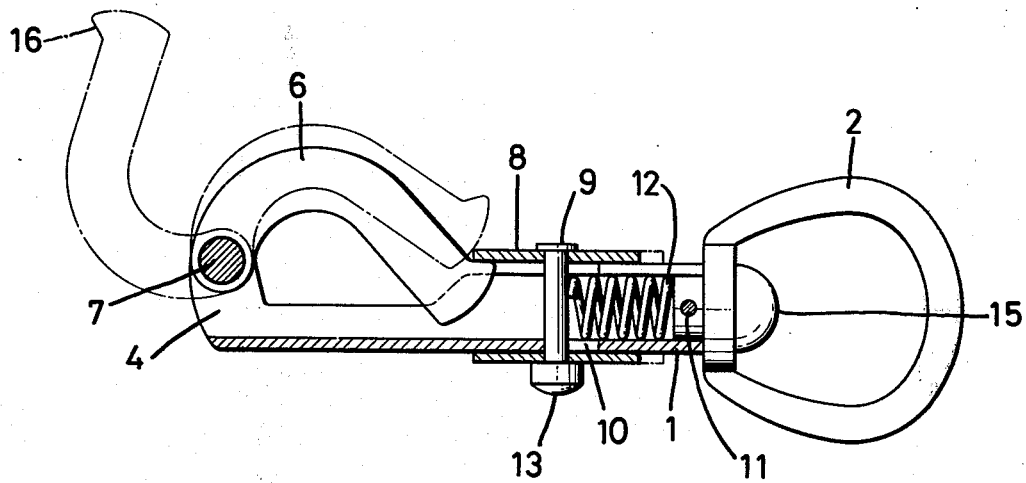

Other objects and features of this invention will become apparent from the following description taken with reference to the accompanying drawings; in which:

FIG. 1 is a perspective view of the swivel hook according to this invention; and FIG. 2 is a partially cutaway side view thereof.

Referring to the drawings, a tubular body 1 is provided with a swivel 2 at one end. The body is formed with a cutaway opening 3 extending axially from adjacent one end thereof to the other end. The body 1 has the other end formed with two tongues 4 projecting upwardly. This body may be conveniently made with such an opening and tongues by pressing a strip of metal sheet into a desired shape and rolling it into a tubular form. The edges are butted against each other at 5 in the rolling.

A hook 6 is pivotally connected at one end thereof between the tongues 4 about a pin 7 into a position where its tip is in the opening 3.

A locking pipe 8 is loosely mounted on the body 1 adjacent the swivel 2. A shaft 9 laterally extends through the locking pipe 8 and also through the body 1 in the opening 3 and an axial slit 10 formed therein diagonally with respect to the opening. The axial slit permits a limited axial movement of the locking pipe 8.

Another shaft 11 extends laterally through the body 1 in a plane perpendicular to the plane in which the shaft 9 passes therethrough. Between these two shafts a precompressed coil spring 12 is captively mounted which biases the locking pipe 8 toward the other end of the body 1. One end of the shaft 9 is made to form a projection 13 which is used to pull the locking pipe 8 against the bias of the spring 12 with a finger thereon.

The hook 6 has such a length that when it is in its closed position as shown in FIG. 2 by a solid line, its tip gets fully locked under the locking pipe 8. The tip is hook-shaped to ensure its engagement in the locking pipe 8.

The swivel 2 has a ring-like portion 14 which is loosely supported between one end of the body 1 and a capped plug 15 mounted in the one end of the body. The shaft 11 serves also to prevent the plug 15 from coming off.

In operation, with the swivel 2 connected to one end of a belt, rope or the like, the hook 6 is caught in a ring of the part to be coupled. To do so, the locking pipe 8 is first pulled back against the bias of the spring 12 to free the hook 6. It is now openable into the position as shown in FIG. 2 by a dotted line and is passed through the ring of the part to be coupled. It is then closed back to the locking pipe 8. After the tip has come into contact with the locking pipe 8, it is further pushed down. The tip will snap into the pipe 8 while pushing it back against the bias of the spring. The shape of the hook's tip facilitates this snap action and serves to prevent any accidental disengagement of the tip from the pipe 8.

It will be understood from the foregoing that the swivel hook according to this invention is easy to lock and unlock due to the fact that the hook 6 can be released simply by pulling back the locking pipe 8 and can be locked therein simply by pushing it down.

While this invention has been described with reference to a preferred embodiment, it is to be understood that various changes are possible without departing from the scope of the following claims.

What is claimed is:

1. A swivel hook comprising:
    a hollow tubular body with a longitudinal opening adjacent one end thereof and an axial slit at the end thereof opposite said longitudinal opening, said axial slit being disposed diagonally with respect to said longitudinal opening;
    a hook member pivotally mounted onto said tubular body at the end thereof containing said longitudinal opening, the tip of said hook opposite the end pivotally mounted onto said body being movable into and out of said longitudinal opening;
    a swivel mounted on the end of the said body opposite the end containing said longitudinal opening;
    locking means surrounding said tubular body for locking said hook member inside said longitudinal opening when said hook member is pivoted thereinto, said locking means being comprised:
        a locking pipe slidably mounted around said tubular body and movable toward and away from said longitudinal opening, and
        a shaft member extending through and beyond said locking pipe and said body through said axial slit to limit the axial movement of said locking pipe and to provide a pulling flange to slide said locking pipe along said body; and
    biasing means captively contained within said tubular body between said shaft member and said swivel for biasing said shaft member and said locking pipe away from said swivel.

* * * * *